US009081221B2

(12) United States Patent
Yu et al.

(10) Patent No.: US 9,081,221 B2
(45) Date of Patent: *Jul. 14, 2015

(54) SLIM BEZEL LIQUID CRYSTAL DISPLAY DEVICE

(71) Applicants: Gang Yu, Shenzhen (CN); Liuyang Yang, Shenzhen (CN)

(72) Inventors: Gang Yu, Shenzhen (CN); Liuyang Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 198 days.

This patent is subject to a terminal disclaimer.

(21) Appl. No.: 13/704,228

(22) PCT Filed: Oct. 26, 2012

(86) PCT No.: PCT/CN2012/083532
§ 371 (c)(1),
(2) Date: Dec. 13, 2012

(87) PCT Pub. No.: WO2014/059692
PCT Pub. Date: Apr. 24, 2014

(65) Prior Publication Data
US 2014/0184979 A1 Jul. 3, 2014

(30) Foreign Application Priority Data

Oct. 17, 2012 (CN) .......................... 2012 1 0395322

(51) Int. Cl.
G02F 1/1333 (2006.01)
(52) U.S. Cl.
CPC ............ *G02F 1/133308* (2013.01); *G02F 2001/133314* (2013.01); *G02F 2201/46* (2013.01)

(58) Field of Classification Search
CPC .............. G02F 1/133308; G02F 1/133615; G02F 2001/133317; G02F 2001/133314; G02F 2201/46; G02F 1/133608
USPC .................. 349/58; 361/681; 345/87
See application file for complete search history.

(56) References Cited

U.S. PATENT DOCUMENTS 5,675,397 A * 10/1997 Fukushima ................... 349/149
6,220,741 B1 * 4/2001 Kawachi et al. ............... 362/561
7,012,189 B2 * 3/2006 Kriege et al. .................. 174/377

(Continued)

FOREIGN PATENT DOCUMENTS

CN 1409207A A 4/2003
CN 100381901 C 4/2008

(Continued)

*Primary Examiner* — Huyen Ngo
(74) *Attorney, Agent, or Firm* — Andrew C. Cheng

(57) ABSTRACT

The present invention provides a slim bezel liquid crystal display device, which includes a rear enclosure, a front enclosure mating the rear enclosure, and a liquid crystal display module arranged inside the rear enclosure. The quid crystal display module has two opposite sides each forming a raised portion. The rear enclosure forms retention sections respectively corresponding to the raised portions, whereby the raised portions are fit into the retention sections so as to fix the liquid crystal display module in the rear enclosure. The slim bezel liquid crystal display device uses a raised portion formed a liquid crystal display module and a retention section formed in a rear enclosure so that during assembling, the raised portion is fit into and engages the retention section so as to fix the liquid crystal display module in the rear enclosure.

8 Claims, 3 Drawing Sheets

(56) References Cited

U.S. PATENT DOCUMENTS

2008/0137272 A1 6/2008 Cheng et al.
2014/0104537 A1* 4/2014 Yu et al. .......................... 349/58

FOREIGN PATENT DOCUMENTS

| CN | 102074163 A | 5/2011 |
| WO | WO2011125628 A1 | 10/2011 |

* cited by examiner

SLIM BEZEL LIQUID CRYSTAL DISPLAY DEVICE

BACKGROUND OF THE INVENTION

1. Field of the Invention

The present invention relates to the field of liquid crystal displaying, and in particular to a slim bezel liquid crystal display device.

2. The Related Arts

Liquid crystal display (LCD) has numerous advantages, such as thin device body, less power consumption, and being free of radiation, and is thus widely used. Most of the liquid crystal display devices that are available in the market are backlighting liquid crystal displays, which comprise a liquid crystal display panel and a backlight module. The operation principle of the liquid crystal display panel is that liquid crystal molecules are arranged between two parallel glass substrates and electricity is selectively applied to the glass substrates to cause change of the orientation of the liquid crystal molecules in order to refract out the light from a backlight module for formation of an image.

A conventional liquid crystal display device generally comprises a rear enclosure, a front enclosure that mates the rear enclosure and a liquid crystal display module arranged in the rear enclosure. The liquid crystal display module is often fixed inside the rear enclosure by being screwed from the front side to the rear side. And then, the front enclosure is fit to the rear enclosure. Referring to FIG. 1, a schematic view is given to show an assembled structure of a conventional liquid crystal display module, which comprises an outer frame 100 forming bolt mounting zones 300. The bolt mounting zones 300 form bolt holes 500 and bolts are received through the bolt holes 500 to fix the liquid crystal display module in the rear enclosure. Due to the arrangement of the bolt mounting zones 300, the front enclosure needs a wide bezel to cover the bolt mounting zones 300. Consequently, a non-display zone of the liquid crystal display device is thus expanded and a display zone 700 is reduced. Further, since the manner of fixing is done by screwing from the front side to the rear side, the thickness of the liquid crystal display device is thus increased. With the constant progress of the manufacturing techniques of liquid crystal display device, the trend of development of liquid crystal display device is now toward bezel slimming and device thinning. The manner of fixing the liquid crystal display module to the rear enclosure affects the bezel width and overall thickness of the liquid crystal display device to quite an extent.

SUMMARY OF THE INVENTION

An object of the present invention is to provide a slim bezel liquid crystal display device, which has a simple structure, is easy to maintain, can effectively realize bezel slimming and device thinning of the liquid crystal display device, and is capable of effectively controlling maintenance cost.

To achieve the object, the present invention provides a slim bezel liquid crystal display device, which comprises a rear enclosure, a front enclosure mating the rear enclosure, and a liquid crystal display module arranged inside the rear enclosure. The liquid crystal display module has two opposite sides each forming a raised portion. The rear enclosure forms retention sections respectively corresponding to the raised portions, whereby the raised portions are fit into the retention sections so as to fix the liquid crystal display module in the rear enclosure.

The liquid crystal display module comprises a back frame and a liquid crystal display panel received in the back frame.

The back frame comprises a base board and a plurality of first side boards connected to the base board. The raised portions are each formed on an outside surface of an end of each of two opposite side boards.

The raised portions are each composed of a constraint section and an extension section extending from the constraint section. The constraint section has a width that is greater than width of the extension section.

The extension section is arranged to extend from one side portion of a free end of the constraint section so as to form a first retention slot at the other side portion of the constraint section.

The rear enclosure comprises a bottom board, second and third side boards respectively connected to opposite sides of the bottom board, and a fourth side board connected to the bottom board and the second and third side boards. The retention sections are respectively formed at free ends of the second and third side boards to correspond to the first retention slots. The retention sections have a width that is smaller than width of the second and third side boards so as to form a second retention slot.

The bottom board and the second, third, and fourth side boards delimit an accommodation space that has an opening. The liquid crystal display module is received in the accommodation space.

The front enclosure comprises a frame body and a stop plate extending from one side of the frame body. The stop plate is provided to correspond to the opening, whereby after assembling, the stop plate completely covers and shields the opening.

The extension section is formed at and extends from a middle portion of a free end of the constraint section. The retention section is a recess so that the extension section is fit into the retention section to fix the liquid crystal display module in the rear enclosure.

The liquid crystal display module comprises a back frame, a liquid crystal display panel received in the back frame, and a backlight module.

The present invention also provides a slim bezel liquid crystal display device, which comprises a rear enclosure, a front enclosure mating the rear enclosure, and a liquid crystal display module arranged inside the rear enclosure, the liquid crystal display module having two opposite sides each forming a raised portion, the rear enclosure forming retention sections respectively corresponding to the raised portions, whereby the raised portions are fit into the retention sections so as to fix the liquid crystal display module in the rear enclosure;

wherein the liquid crystal display module comprises a back frame and a liquid crystal display panel received in the back frame;

wherein the back frame comprises a base board and a plurality of first side boards connected to the base board, the raised portions being each formed on an outside surface of an end of each of two opposite side boards;

wherein the raised portions are each composed of a constraint section and an extension section extending from the constraint section, the constraint section having a width that is greater than width of the extension section;

wherein the extension section is arranged to extend from one side portion of a free end of the constraint section so as to form a first retention slot at the other side portion of the constraint section;

wherein the rear enclosure comprises a bottom board, second and third side boards respectively connected to opposite sides of the bottom board, and a fourth side board connected to the bottom board and the second and third side boards, the retention sections being respectively formed at free ends of the second and third side boards to correspond to the first retention slots, the retention sections having a width that is smaller than width of the second and third side boards so as to form a second retention slot;

wherein the bottom board and the second, third, and fourth side boards delimit an accommodation space that has an opening, the liquid crystal display module being received in the accommodation space;

wherein the front enclosure comprises a frame body and a stop plate extending from one side of the frame body, the stop plate being provided to correspond to the opening, whereby after assembling, the stop plate completely covers and shields the opening; and wherein the liquid crystal display module comprises a back frame, a liquid crystal display panel received in the back frame, and a backlight module.

The efficacy of the present invention is that the present invention provides a slim bezel liquid crystal display device, which comprises a raised portion formed a liquid crystal display module and a retention section formed in a rear enclosure so that during assembling, the raised portion is fit into and engages the retention section so as to fix the liquid crystal display module in the rear enclosure. The structure is simple and assembling is easy so as to effectively achieve bezel slimming and device thinning of a liquid crystal display device. Further, easy disassembling can be done with the liquid crystal display module in case of maintenance and replacement so that the maintenance cost can be effectively controlled.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
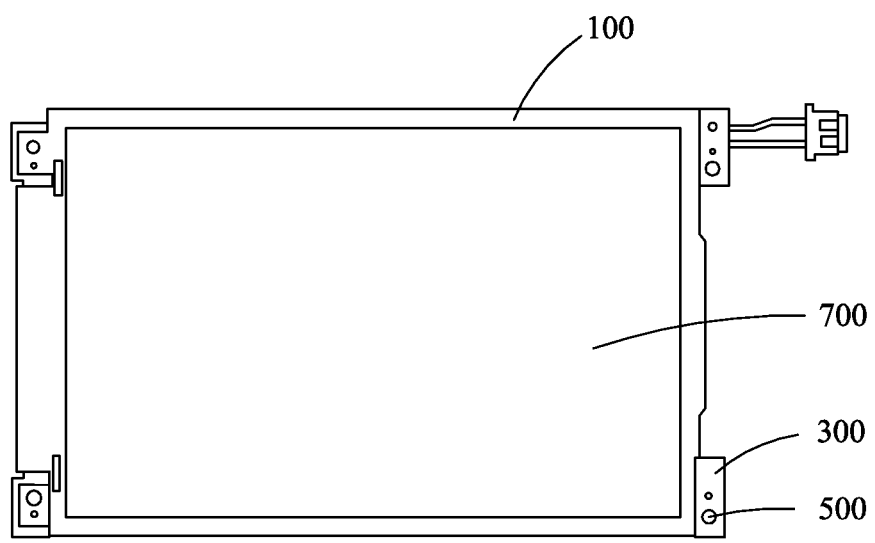
FIG. 1 is a schematic view showing an assembled structure of a conventional liquid crystal display module.
Figure 2:
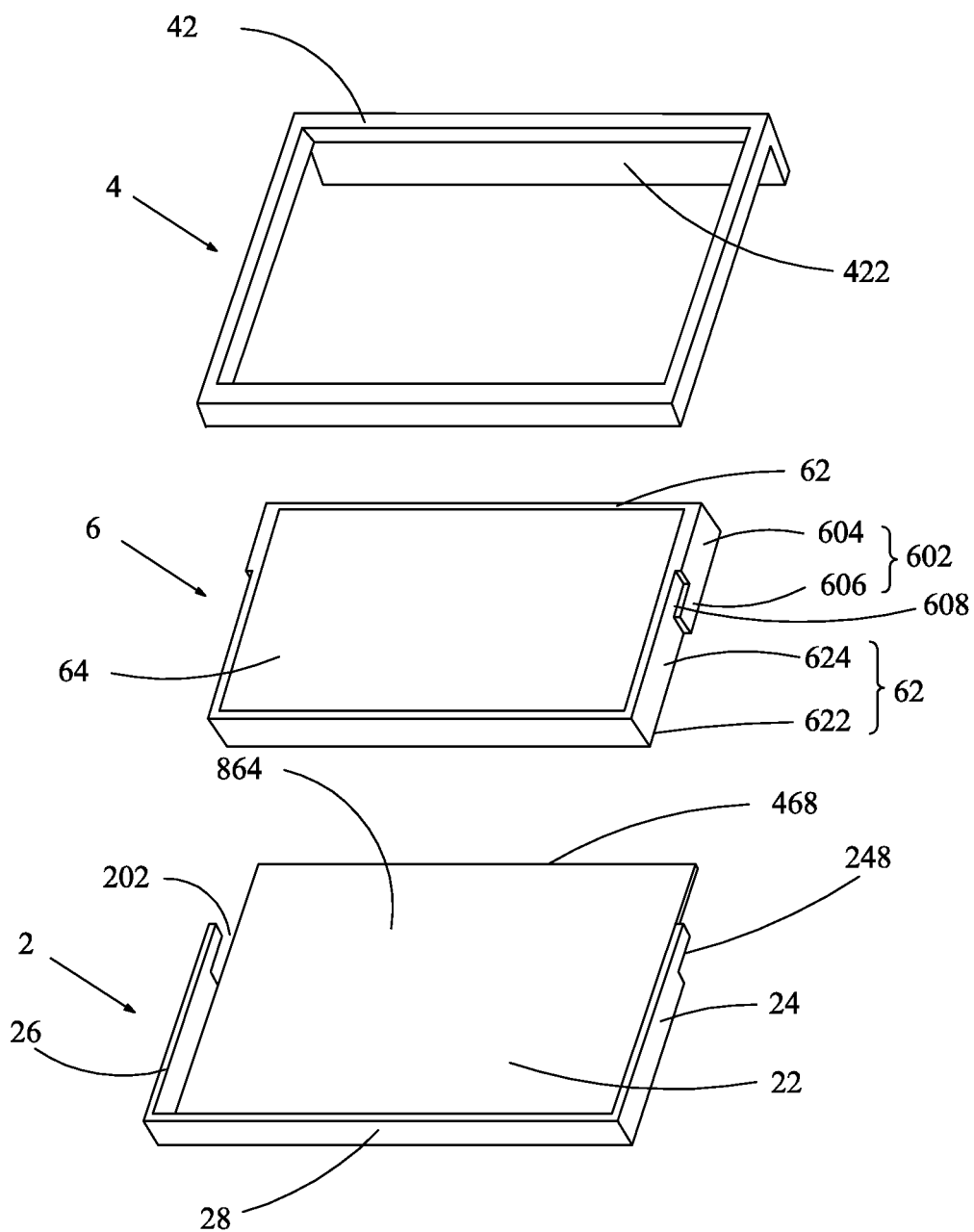
FIG. 2 is an exploded view showing a slim bezel liquid crystal display device according to a preferred embodiment of the present invention.
Figure 3:
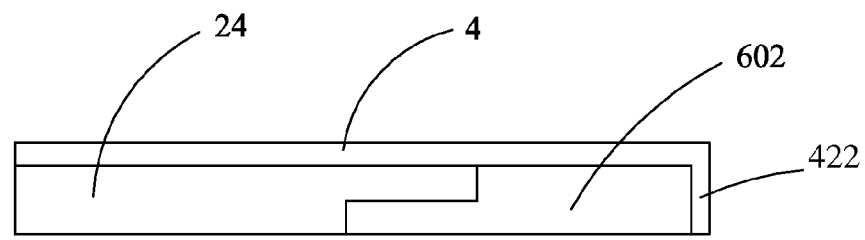
FIG. 3 is a right side view of an assembled structure of the slim bezel liquid crystal display device of FIG. 2.

Referring to FIGS. 2 and 3, the present invention provides a slim bezel liquid crystal display device, which comprises a rear enclosure 2, a front enclosure 4 mating the rear enclosure 2, and a liquid crystal display module 6 arranged inside the rear enclosure 2. The liquid crystal display module 6 has two opposite sides each forming a raised portion 602. The rear enclosure 2 forms retention sections 202 respectively corresponding to the raised portions 602, whereby the raised portions 602 are fit into the retention sections 202 so as to fix the liquid crystal display module 6 in the rear enclosure 2. The structure is simple and assembling is easy so as to effectively achieve bezel slimming and device thinning of the liquid crystal display device. Further, easy disassembling can be done with the liquid crystal display module in case of maintenance and replacement so that the maintenance cost can be effectively controlled.

The liquid crystal display module 6 comprises a back frame 62 and a liquid crystal display panel 64 received in the back frame 62. The back frame 62 comprises a base board 622 and a plurality of first side boards 624 connected to the base board 622. The raised portions 602 are each formed on an outside surface of an end of each of two opposite side boards 624. The raised portions 602 are each composed of a constraint section 604 and an extension section 606 extending from the constraint section 604. The constraint section 604 has a width that is greater than width of the extension section 606. In the instant embodiment, the extension section 606 is arranged to extend from one side portion of a free end of the constraint section 604 so as to form a first retention slot 608 at the other side portion of the constraint section 604.

The rear enclosure 2 comprises a bottom board 22, second and third side boards 24, 26 respectively connected to opposite sides of the bottom board 22, and a fourth side board 28 connected to the bottom board 22 and the second and third side boards 24, 26. The retention sections 202 are respectively formed at free ends of the second and third side boards 24, 26 to correspond to the first retention slots 608. The retention sections 202 have a width that is smaller than width of the second and third side boards 24, 26 so as to form a second retention slot 248.

The bottom board 22 and the second, third, and fourth side boards 24, 26, 28 delimit an accommodation space 864 that has an opening 468. The liquid crystal display module 6 is received in the accommodation space 864.

The front enclosure 4 comprises a frame body 42 and a stop plate 422 extending from the frame body 42. The stop plate 422 is provided to correspond to the opening 468. After assembling, the stop plate 422 may completely cover and shield the opening 468.

To assemble, the liquid crystal display module 6 is inserted through the opening 468 into the accommodation space 864 so that the extension sections 606 are fit into he second retention slots 248 and abuts ends of the second and third side boards 24, 26. The retention sections 202 are fit in the first retention slots 608 and abut ends of the constraint sections 604. Then, the front enclosure 4 is set to mate the rear enclosure 2 and under this condition, the stop plate 422 completely shields the opening 468 so as to retain the liquid crystal display module 6 between the front enclosure 4 and the rear enclosure 2.

Figure 4:
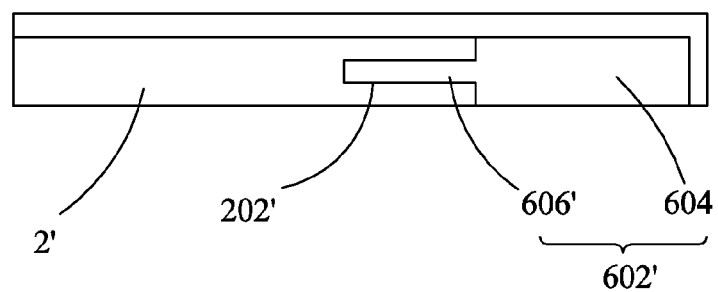
FIG. 4 is a right side view of an assembled structure of a slim bezel liquid crystal display device according to another preferred embodiment of the present invention.

Referring to FIG. 4, a right side view is given to illustrate an assembled structure of a slim bezel liquid crystal display device according to another embodiment of the present invention. In the instant embodiment, the extension section 606' is formed at and extends from a middle portion of a free end of the constraint section 604 to form a centrally-projecting raised portion 602'. The retention section 202' is a recess so that the extension section 606' is fit into the retention section 202' to fix the liquid crystal display module 6 in the rear enclosure 2'. The instant embodiment provides the same technique effect as that of the previous embodiment.

In summary, the present invention provides a slim bezel liquid crystal display device, which comprises a raised portion formed a liquid crystal display module and a retention section formed in a rear enclosure so that during assembling, the raised portion is fit into and engages the retention section so as to fix the liquid crystal display module in the rear enclosure. The structure is simple and assembling is easy so as to effectively achieve bezel slimming and device thinning of a liquid crystal display device. Further, easy disassembling can be done with the liquid crystal display module in case of maintenance and replacement so that the maintenance cost can be effectively controlled.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A slim bezel liquid crystal display device, comprising a rear enclosure, a front enclosure mating the rear enclosure, and a liquid crystal display module arranged inside the rear enclosure, wherein the liquid crystal display module comprises a back frame and a liquid crystal display panel received in the back frame, the back frame comprising a base board and opposite first side boards connected to the base board and each having an outside surface on which a raised portion is formed at an end portion thereof, the rear enclosure forming retention sections respectively corresponding to the raised portions, whereby the raised portions are fit into the retention sections so as to fix the liquid crystal display module in the rear enclosure.

2. The slim bezel liquid crystal display device as claimed in claim 1, wherein the raised portions are each composed of a constraint section and an extension section extending from the constraint section, the constraint section having a width that is greater than width of the extension section.

3. The slim bezel liquid crystal display device as claimed in claim 2, wherein the extension section is arranged to extend from one side portion of a free end of the constraint section so as to form a first retention slot at the other side portion of the constraint section.

4. The slim bezel liquid crystal display device as claimed in claim 3, wherein the rear enclosure comprises a bottom board, second and third side boards respectively connected to opposite sides of the bottom board, and a fourth side board connected to the bottom board and the second and third side boards, the retention sections being respectively formed at free ends of the second and third side boards to correspond to the first retention slots, the retention sections having a width that is smaller than width of the second and third side boards so as to form a second retention slot.

5. The slim bezel liquid crystal display device as claimed in claim 4, wherein the bottom board and the second, third, and fourth side boards delimit an accommodation space that has an opening, the liquid crystal display module being received in the accommodation space.

6. The slim bezel liquid crystal display device as claimed in claim 5, wherein the front enclosure comprises a frame body and a stop plate extending from one side of the frame body, the stop plate being provided to correspond to the opening, whereby after assembling, the stop plate completely covers and shields the opening.

7. The slim bezel liquid crystal display device as claimed in claim 1, wherein the liquid crystal display module that comprises a back frame and a liquid crystal display panel received in the back frame further comprises a backlight module.

8. A slim bezel liquid crystal display device, comprising a rear enclosure, a front enclosure mating the rear enclosure, and a liquid crystal display module arranged inside the rear enclosure, wherein the liquid crystal display module comprises a back frame and a liquid crystal display panel received in the back frame, the back frame comprising a base board and opposite first side boards connected to the base board and each having an outside surface on which a raised portion is formed at an end portion thereof, the rear enclosure forming retention sections respectively corresponding to the raised portions, whereby the raised portions are fit into the retention sections so as to fix the liquid crystal display module in the rear enclosure;

wherein the raised portions are each composed of a constraint section and an extension section extending from the constraint section, the constraint section having a width that is greater than width of the extension section;

wherein the extension section is arranged to extend from one side portion of a free end of the constraint section so as to form a first retention slot at the other side portion of the constraint section;

wherein the rear enclosure comprises a bottom board, second and third side boards respectively connected to opposite sides of the bottom board, and a fourth side board connected to the bottom board and the second and third side boards, the retention sections being respectively formed at free ends of the second and third side boards to correspond to the first retention slots, the retention sections having a width that is smaller than width of the second and third side boards so as to form a second retention slot;

wherein the bottom board and the second, third, and fourth side boards delimit an accommodation space that has an opening, the liquid crystal display module being received in the accommodation space;

wherein the front enclosure comprises a frame body and a stop plate extending from one side of the frame body, the stop plate being provided to correspond to the opening, whereby after assembling, the stop plate completely covers and shields the opening; and wherein the liquid crystal display module that comprises a back frame and a liquid crystal display panel received in the back frame further comprises a backlight module.

* * * * *